United States Patent [19]

Mark

[11] 4,252,916

[45] Feb. 24, 1981

[54] THERMALLY STABLE TRANSLUCENT POLYCARBONATE COMPOSITIONS

[75] Inventor: Victor Mark, Evansville, Ind.

[73] Assignee: General Electric Company, Pittsfield, Mass.

[21] Appl. No.: 967,087

[22] Filed: Dec. 6, 1978

[51] Int. Cl.³ .............................................. C08L 27/12
[52] U.S. Cl. ..................................... 525/151; 525/146
[58] Field of Search ...................... 260/873, 899, 900; 525/146, 151, 1

[56] References Cited

U.S. PATENT DOCUMENTS

| | | | |
|---|---|---|---|
| 2,820,772 | 1/1958 | Barnhart | 260/900 |
| 3,005,795 | 10/1961 | Busse | 525/68 |
| 3,437,631 | 4/1969 | Cleveland | 260/873 |
| 3,933,730 | 1/1976 | Hoogeboom | 525/68 |

*Primary Examiner*—J. Ziegler
*Attorney, Agent, or Firm*—William F. Mufatti

[57] ABSTRACT

Thermally stable translucent polycarbonate compositions comprising an admixture of an aromatic polycarbonate and a minor amount of a partially fluorinated polyolefin.

4 Claims, No Drawings

THERMALLY STABLE TRANSLUCENT POLYCARBONATE COMPOSITIONS

This invention is directed to a thermally stable translucent polycarbonate composition comprising an admixture of an aromatic polycarbonate and a minor amount of a partially fluorinated polyolefin.

BACKGROUND OF THE INVENTION

Translucent polycarbonates can be manufactured for internally illuminated signs, protective light diffusers for fluorescent, incandescent or gaseous discharge lamps, translucent window lights, and the like.

It is known in the art that polycarbonate resins can be rendered translucent by the use of one or more inorganic additives such as titanium dioxide, zinc oxide, lead carbonate, lithopone, talc, etc., either alone or in combination. However, all of these inorganic salts produce translucent formulations which are not completely satisfactory as they are deficient in one or more properties. For example, at the high temperatures normally encountered during manufacturing, many of these inorganic light diffusers are chemically reactive and degrade the desirable physical and optical properties of the polycarbonate composition.

In making a translucent formulation, many variables are to be considered; e.g., the color of the light reflected from the surface of a molded part, the color and intensity of the light transmitted through the molded part, and particularly, the radial energy distribution of light transmitted through a molded part from a parallel beam of light. An ideally diffuse part, when illuminated by a narrow, parallel beam of light, will exhibit a spherical energy distribution on the side opposite the impinging beam, a property especially important when it is desired to obscure the light source and present a uniformly illuminated surface. The more this distribution departs from the spherical (that is, the greater the proportion of light propagated specularly through the part), the less ideal is the part as a diffuser.

This property of a light diffuser can be measured conveniently on a G.E. Recording Spectrophotometer by measuring the diffuse light ($T_d$) transmitted through a sample, the light transmitted specularly being absorbed by a black velvet light trap placed in the external sample port, and comparing it with the total light ($T_t$) transmitted through the sample. The ratio, $T_d/T_t$, is called the diffusivity, D, of the sample. The closer this ratio approaches 1.0, the most closely the sample approaches an ideal diffuser.

In addition, a translucent composition must also be thermally stable, retain its desirable physical toughness and impact strength and be easily processable.

DESCRIPTION OF THE INVENTION

It has now been found that a thermally stable polycarbonate composition with excellent toughness and high impact strength can be obtained by admixing a halogen-free aromatic polycarbonate and a minor amount of a partially fluorinated polyolefin alone or in admixture with polymers of tetrafluoroethylene and hexafluoropropylene. The partially fluorinated polyolefin of the instant invention can be poly(vinylidene fluoride), poly(vinyl fluoride), poly(trifluoroethylene), poly(chlorotrifluorethylene) and poly(trifluoroethylene alkali metal sulfonate).

For ease of blending with the polycarbonate resin, the fluorinated polyolefin, or fluorinated polyolefin mixture, is preferably mixed in the form of particles.

The amount of partially fluorinated polyolefin which can be used is not critical and can range from about 0.01 to about 5.0 weight percent based on the weight of the polycarbonate composition.

The aromatic polycarbonates that can be employed in the practice of this invention are homopolymers and copolymers that are prepared by reacting a dihydric phenol with a carbonate precursor.

The dihydric phenols that can be employed to prepare the polycarbonates are bisphenols such as bis(4-hydroxyphenyl)methane, 2,2-bis(4-hydroxyphenyl)propane (hereinafter referred to as bisphenol-A), 2,2-bis(4-hydroxy-3-methylphenyl)propane, 4,4-bis(4-hydroxyphenyl)heptane, etc., dihydric phenol ethers such as bis(4-hydroxyphenyl)ether, etc.; dihydroxydiphenyls such as p,p'-dihydroxydiphenyl, etc.; dihydroxyaryl sulfones such as bis(4-hydroxyphenyl)sulfone, bis(3,5-dimethyl-4-hydroxy-phenyl)sulfone, etc.; dihydroxy benzenes, resorcinol, hydroquinone, alkyl-substituted dihydroxy benzenes such as 1,4-dihydroxy-3-methylbenzene, etc.; and dihydroxy diphenyl sulfoxides such as bis(4-hydroxy-phenyl)sulfoxides, etc. Other dihydric phenols can also be employed such as are disclosed in U.S. Pat. Nos. 2,999,835, 3,028,365 and 3,153,008 which are incorporated herein by reference.

It is of course possible to employ two or more different dihydric phenols or a copolymer of a dihydric phenol with a glycol or with hydroxy or acid terminated polyester, or with a dibasic acid in the event a carbonate copolymer or interpolymer rather than a homopolymer is desired for use in the preparation of the aromatic polycarbonates of the invention. Blends of any of the above materials can also be employed to provide the aromatic polycarbonate.

The carbonate precursor employed can be either a carbonyl halide, a carbonate ester or a haloformate. The carbonyl halides which can be employed are carbonyl bromide, carbonyl chloride and mixtures thereof. Typical of the carbonate esters which can be employed are diphenyl carbonate, di-(halophenyl)carbonate, such as di-(chlorophenyl)carbonate, di-(bromophenyl)carbonate, di-(trichlorophenyl)carbonate, di-(tribromophenyl)carbonate, etc., di-(alkylphenyl)carbonate such as di-(tolyl)carbonate, etc., di-(naphthyl)carbonate, di-(chloronaphthyl)carbonate, etc., or mixtures thereof. The suitable haloformates include bis-haloformates of dihydric phenols (bischloroformates of hydroquinone, etc.) or glycols (bishaloformates of ethylene glycol, neopentyl glycol, polyethylene glycol, etc.). While other carbonate precursors will occur to those skilled in the art, carbonyl chloride, also known as phosgene, is preferred.

Also included are the polymeric materials of a dihydric phenol, a dicarboxylic acid and carbonic acid. These are disclosed in U.S. Pat. No. 3,169,121 which is incorporated herein by reference.

The aromatic polycarbonates of the invention are typically prepared by employing a molecular weight regulator, an acid acceptor and a catalyst. The molecular weight regulators which can be employed include phenol, cyclohexanol, methanol, para-tertiary-butylphenol, etc. Preferably, phenol is employed as the molecular weight regulator.

The acid acceptor can be either an organic or an inorganic acid acceptor. A suitable organic acid acceptor is a tertiary amine and includes such materials as pyridine, triethylamine, dimethylaniline, tributylamine, etc. The inorganic acid acceptor can be one which can be either a hydroxide, a carbonate, a bicarbonate, or a phosphate of an alkali or alkali earth metal.

The catalysts which can be employed are those that typically aid the polymerization of the monomer with phosgene. Suitable catalysts include tertiary amines such as triethylamine, tripropylamine, N,N-dimethylaniline, quaternary ammonium compounds such as, for example, tetraethylammonium bromide, cetyl triethyl ammonium bromide, tetra-n-heptylammonium iodide, tetra-n-propyl ammonium bromide, tetramethylammonium chloride, tetramethyl ammonium hydroxide, tetra-n-butyl ammonium iodide, benzyltrimethyl ammonium chloride and quaternary phosphonium compounds such as, for example, n-butyltriphenyl phosphonium bromide and methyltriphenyl phosphonium bromide.

Also included are branched polycarbonates wherein a polyfunctional aromatic compound is reacted with the monomer and carbonate precursor to provide a thermoplastic randomly branched polycarbonate. These polyfunctional aromatic compounds contain at least three functional groups which are carboxyl, carboxylic anhydride, haloformyl, or mixtures thereof. Illustrative polyfunctional aromatic compounds which can be employed include trimellitic anhydride, trimellitic acid, trimellityl trichloride, 4-chloroformyl phthalic anhydride, pyromellitic acid, pyromellitic dianhydride, mellitic acid, mellitic anhydride, trimesic acid, benzophenonetetracarboxylic acid, benzophenonetetracarboxylic anhydride, and the like. The preferred polyfunctional aromatic compounds are trimellitic anhydride and trimellitic acid or their acid halide derivatives.

Blends of linear and branched aromatic polycarbonates are also included within the scope of this invention.

The compositions of the invention are prepared by admixing the partially fluorinated polyolefin with the halogen-free polycarbonate.

DESCRIPTION OF THE PREFERRED EMBODIMENT

The following examples are set forth to illustrate the best mode currently known to practice the invention. Unless otherwise specified, parts or percents are by weight.

EXAMPLE I

One hundred parts of an aromatic polycarbonate, prepared by reacting 2,2-bis(4-hydroxyphenyl)propane (hereinafter referred to as bisphenol-A) and phosgene in the presence of an acid acceptor and a molecular weight regulator and having an intrinsic viscosity of 0.57 dl/g was mixed with 0.5 parts of a finely divided poly(vinylidene fluoride). The resulting mixture was then fed to an extruder, which extruder was operated at about 265° C., and the extrudate was comminuted into pellets.

The pellets were then molded at about 315° C. into test samples measuring 2 in. by 3 in. by 0.062 in., using conventional molding techniques. The optical properties and surface color of the test samples were measured using the G.E. Recording Spectrophotometer described above and in accordance with ASTM Yellowness Index (YI) Test D1925-70. The results are set forth in Table I.

The test samples were also measured for impact strength according to ASTM D256, Method A, and these results are set forth in Table II.

The pellets were also subjected to an abusive molding test wherein the pellets were molded at about 340° C. After molding five samples, the temperature was increased to about 350° C. Molding was continued until five additional samples were molded, whereupon the temperature was again increased by 10° C. Increasing the temperature by 10° C. increments was continued until the samples catastrophically failed. The surface color of the fifth sample in each set was measured with the G.E. Recording Spectrophotometer and compared with the standard sample molded at 315° C. To ensure uniform color, the sample chips were backed with a plaque of barium sulfate during these measurements. Color differences, $\Delta E$, between the test sample and the standard sample were calculated using Adams Chromatic Value Equation was found in ASTM D2244/68, Method A. The results obtained are set forth in Table III.

EXAMPLE II

Example I was repeated except that the aromatic polycarbonate having an intrinsic viscosity of 0.57 dl/g was mixed with 0.25 parts of finely divided poly(vinylidene fluoride) and 0.25 parts of poly(tetrafluoroethylene). The optical properties, impact strength and abusive molding test were determined according to the procedures of Example I. The results obtained are also set forth in Tables I, II and III, respectively.

EXAMPLE III

One hundred parts of the polycarbonate resin of Example I was mixed with 0.10 parts of titanium dioxide pigment. The mixture was molded into test samples and then optical properties were determined as described in Example I. The results obtained are set forth in Table I.

EXAMPLE IV

Example III was repeated except that 0.25 parts of titanium dioxide pigment was used instead of 0.10 parts. The mixture was processed into test parts and then optical properties were determined as in Example I. The results obtained are set forth in Table I.

TABLE I

| Sample of Example | Td (%) | Tt (%) | D (Td/Tt) | YI |
|---|---|---|---|---|
| I | 61.89 | 63.28 | 0.978 | 9.0 |
| II | 58.21 | 59.47 | 0.979 | 8.9 |
| III | 40.58 | 41.54 | 0.977 | |
| IV | 49.28 | 63.10 | 0.781 | |

TABLE II

| Sample of Example | Izod Impact (ft. lb./in.) | % Ductile Breaks |
|---|---|---|
| I | 14.9 | 100 |
| II | 14.9 | 100 |
| IV | 3.6 | 0 |

TABLE III

| Sample of Example | $\Delta E$ | | | | |
|---|---|---|---|---|---|
| | 340° C. | 350° C. | 360° C. | 370° C. | 380° C. |
| I | 3.2 | 5.9 | 10.1 | 16.4 | 23.1 |
| II | 3.1 | 6.0 | 10.6 | 16.6 | 23.6 |

From the results set forth in the foregoing Tables, it is evident that compositions obtained from a mixture of a particulate poly(vinylidene fluoride) and an aromatic polycarbonate resin exhibit good light-transmission and diffusivity, good thermal stability, and excellent toughness and impact strength.

It is also apparent that the diffusivity of a composition comprising a mixture of particulate poly(vinylidene fluoride) and the aromatic polycarbonate can be matched by using a suitable concentration of titanium dioxide pigment, but only at the expense of total light transmission; while the transmission can only be matched with a corresponding loss of diffusivity.

What is claimed is:

1. A thermally stable translucent polycarbonate composition consisting essentially of an admixture of an aromatic polycarbonate and a minor amount of a partially fluorinated polyolefin selected from the group consisting of poly(vinylidene fluoride), poly(vinyl fluoride), poly(trifluoroethylene), poly(chlorotrifluoroethylene), and poly(trifluoroethylene alkali metal sulfonate) or mixtures of said partially fluorinated polyolefin with poly(tetrafluoroethylene) and poly(hexafluoropropylene).

2. The composition of claim 1 wherein the partially fluorinated polyolefin or partially fluorinated polyolefin-fully fluorinated polyolefin mixture is present in an amount of from 0.01 to about 5.0 weight percent based on the weight of the polycarbonate composition.

3. The composition of claim 1 wherein said partially fluorinated polyolefin is poly(vinylidene fluoride).

4. The composition of claim 1 in which the aromatic carbonate polymer is the reaction product of 2,2-bis(4-hydroxyphenyl)propane.

* * * * *